Aug. 26, 1947.  J. A. MAURER, JR  2,426,367
VARIABLE DENSITY RECORDING OPTICAL SYSTEM
Original Filed Aug. 2, 1940    2 Sheets-Sheet 1
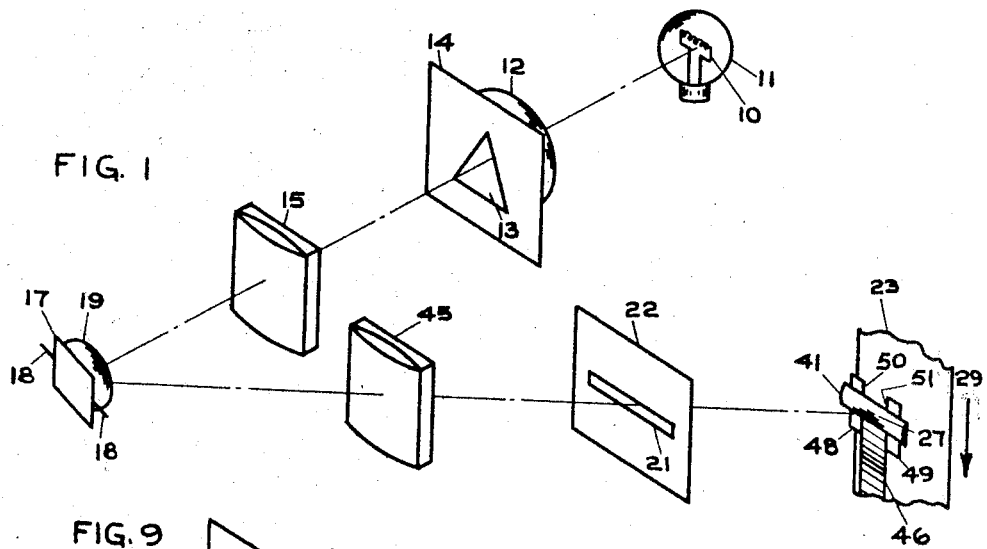
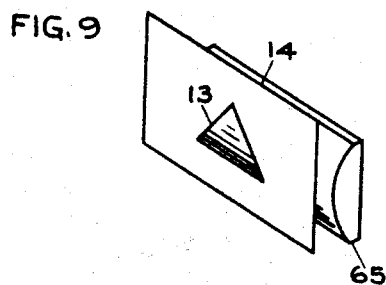
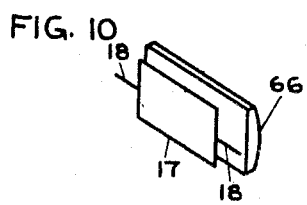
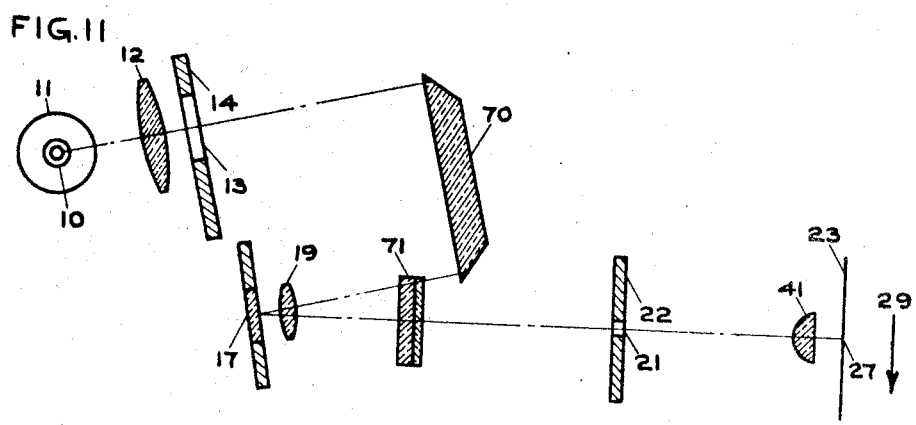
INVENTOR
JOHN A. MAURER, JR.
BY
AGENT Aug. 26, 1947.                    J. A. MAURER, JR                    2,426,367
                        VARIABLE DENSITY RECORDING OPTICAL SYSTEM
                        Original Filed Aug. 2, 1940      2 Sheets-Sheet 2
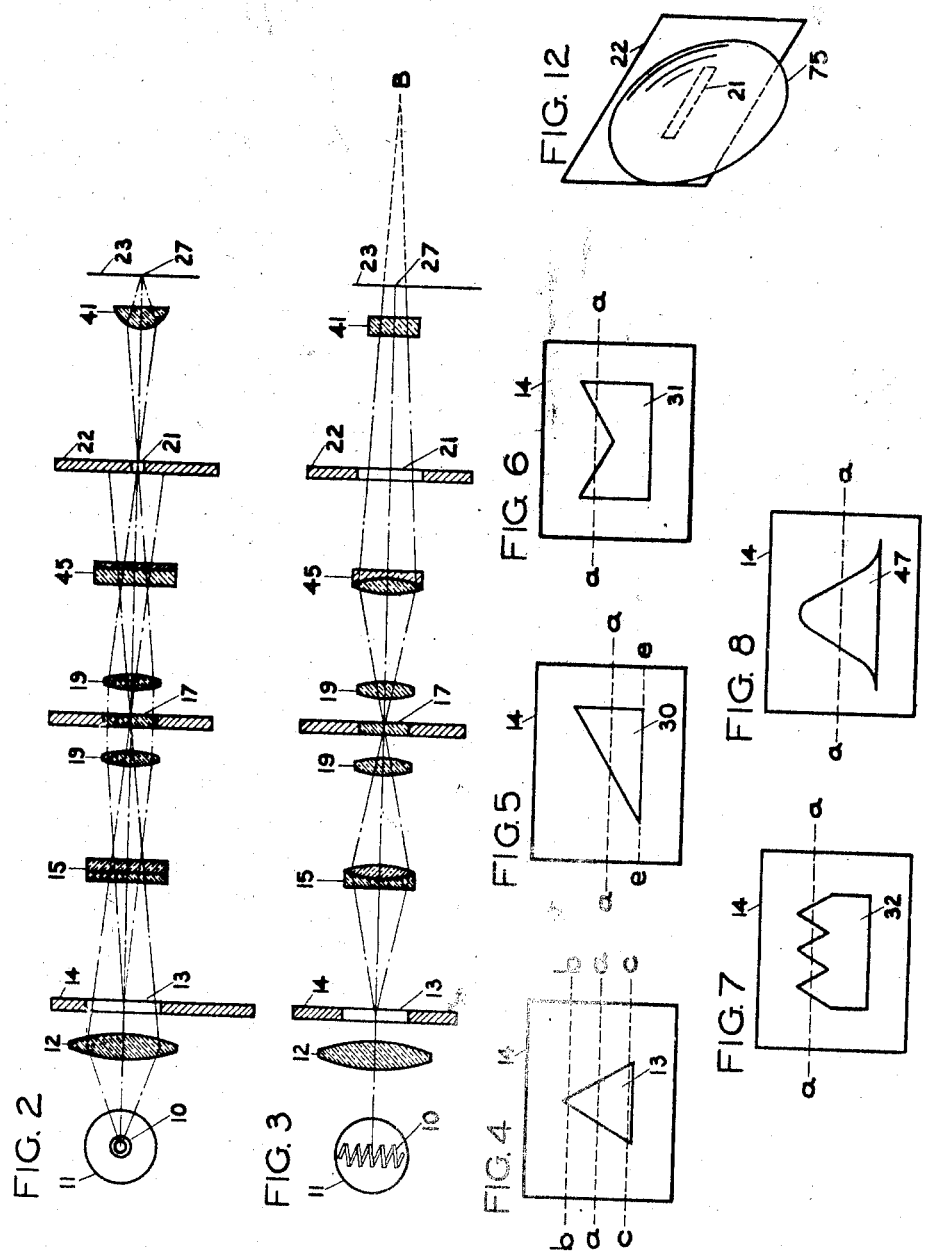
INVENTOR
JOHN A. MAURER, Jr.
BY Otto J. Nathansohn
AGENT Patented Aug. 26, 1947

2,426,367

UNITED STATES PATENT OFFICE 2,426,367

VARIABLE DENSITY RECORDING OPTICAL SYSTEM

John A. Maurer, Jr., New York, N. Y., assignor to J. A. Maurer, Inc., New York, N. Y., a corporation of New York Original application August 2, 1940, Serial No. 349,515. Divided and this application November 21, 1944, Serial No. 564,451

8 Claims. (Cl. 88—24)

This invention relates to optical systems for the photographic recording of electrical impulses on a moving film such as are used in sound recording, picture transmission, and the like, and this application is a division of my application Serial No. 349,515, filed August 2, 1940, which is also assigned to J. A. Maurer, Inc.

More particularly, the invention relates to optical systems of the class referred to above wherein a small mirror vibrated by an oscillograph galvanometer, or a similar device for translating electrical impulses into mechanical vibrations, modulates a light beam in accordance with the electrical impulses to be recorded. The mirror oscillograph recording optical systems known heretofore, however, have the disadvantage that the light flux from the recording light source, such as the filament of an incandescent lamp, is not efficiently utilized therein. This unfavorable condition is due to the fact that the aperture of the oscillograph mirror is the limiting aperture in the two coordinate planes of the known optical systems, and that it cannot be enlarged beyond a certain degree since the physical size of the mirror must be comparatively small in order to avoid distortions due to its mass. For a given light source, therefore, the amount of light flux reaching the moving film is unduly limited in those optical systems, and this limitation makes itself particularly felt when filters are used at some position in the optical system, for example, for selecting light rays of a certain wave length, or for other purposes.

Another drawback of the known mirror oscillograph recording optical systems is that a portion of the light flux from the recording light source is not effectively prevented therein from falling on parts other than the oscillograph mirror, or on the structure housing the optical system. This portion of the light flux is to some extent reflected diffusely, thus forming stray light even though the surfaces on which it is incident may be black. Such stray light is objectionable because it may cause an additional exposure of the moving film, which should be exposed only to light flux modulated by the oscillograph mirror.

Still more particularly, the invention relates to mirror oscillograph recording optical systems by means of which the impulse records are produced as tracks of constant width but varying density. Such tracks are known as variable density tracks.

In the known variable density recording optical systems of the mirror oscillograph type the variable density effect is obtained by an imagery which is even less efficient than the imagery described hereinabove as being generally employed in the prior art mirror oscillograph recording optical systems. Alternatively, the variable density effect is obtained by the use of additional parts such as graded screens, penumbra stops, or the like. But it is difficult to manufacture graded screens which have a sufficiently accurate gradation, and the use of penumbra stops all but excludes certain modifications of the optical system which are highly desirable from the standpoint of producing impulse records with superior fidelity.

It is, therefore, the primary object of the present invention to provide a variable density recording optical system of the mirror oscillograph type wherein the variable density effect is obtained solely by means of an efficient imagery.

Another object of the invention is the provision of such an optical system which is highly efficient as regards the utilization of the light flux from the recording light source.

Another object of the invention is the provision of such an optical system whose limiting aperture in the one of its co-ordinate planes can be made much larger than the aperture of the oscillograph mirror.

Another object of the invention is the provision of such an optical system wherein the formation of stray light is reduced to a negligible amount.

Another object of the invention is the provision of such an optical system wherein a linear relation may easily be established between the electrical impulses to be recorded and the light transmission of the track used for their reproduction.

Another object of the invention is the provision of such an optical system which is particularly satisfactory as regards ease of manufacture and convenience of adjustment.

Another object of the invention is the provision of such an optical system which may be built with small physical size and at comparatively little cost.

Still other objects of the invention include those which are hereinafter stated or apparent, or which are incidental to the invention.

In the optical system according to the invention, the oscillograph mirror is adapted to vibrate about a horizontal axis while the film moves past the recording point in a substantially vertical direction, the recording point being the point at which the optical axis of the system strikes the film. The optical system also has means for forming a uniformly illuminated light spot whose horizontal extension varies in a vertical direction, and means effecting an imagery of this light spot which is different in the two co-ordinate planes of the optical system: In the vertical plane, the light spot is conjugate to the recording point while, in the horizontal plane, it is conjugate to a position other than the recording point so that the recording point is conjugate to the light spot in only the vertical plane. By virtue of this imagery, a variable density effect is obtained at the recording point when the oscillograph mirror vibrates about its horizontal axis.

The imagery of the light spot is effected by a first set of imaging means with respect to which the light spot and the recording point are conjugate in the vertical plane, and a second set of imaging means with respect to which the light spot and said position are conjugate in the horizontal plane. The first set of imaging means includes a first imaging means which acts in the vertical plane, and a second imaging means which acts in only the vertical plane. The first imaging means is placed in front of the oscillograph mirror and has one of its conjugate foci at the light spot and the other substantially at a horizontal slit positioned between the mirror and the recording point, and the second imaging means has one of its conjugate foci at the slit and the other at the recording point.

The second set of imaging means includes third and fourth imaging means both of which act in only the horizontal plane. The third imaging means has one of its conjugate foci at the light spot and the other substantially at the oscillograph mirror so that an intermediate image of the light spot is formed substantially on the mirror. The fourth imaging means, in its turn, has one of its conjugate foci at the intermediate image and the other at said position. When then the oscillograph mirror vibrates about its horizontal axis, a variable density track is produced on the film as it moves past the recording point in a substantially vertical direction.

The means for forming the light spot, finally, include a recording light source and a screen with an opening whose horizontal extension varies in a vertical direction. The opening is uniformly illuminated by light flux from the light source, and its intermediate image is formed substantially on the oscillograph mirror as has been explained in the preceding paragraph. At the same time, an image of the light source is formed substantially on the mirror by the action of a condenser lens in the vertical plane. In this manner, substantially all the light flux entering the optical system through the opening is controlled by the oscillograph mirror whereby the formation of stray light is reduced to a negligible amount.

In the foregoing brief explanation of the state of the art and summary of the invention, and throughout the present specification, the term "co-ordinate planes" designates two planes at right angles to each other whose line of intersection is the optical axis of the system. The horizontal plane is the co-ordinate plane which contains the axis of the oscillograph mirror and the slit, while the vertical plane is the co-ordinate plane at right angles to the horizontal plane. The plane of the slit, finally, is the plane which contains the slit, and is at right angles to both the vertical and horizontal planes.

In the present specification, the terms "vertical" and "horizontal" thus are not used in any absolute sense but merely in order to distinguish between two planes, or directions, at right angles to one another, and choice between those terms has been determined solely by convenience in description and illustration.

The invention will be better understood when the following description is considered with the accompanying drawings of certain presently preferred embodiments thereof, and its scope will be pointed out in the appended claims.

In the drawings:

Fig. 1 is a diagrammatic perspective view of an optical system embodying the invention, Fig. 2 is a diagrammatic longitudinal section in the vertical plane of the optical system shown in Fig. 1, the optical axis being represented as a straight line and an oscillograph mirror as an aperture, Fig. 3 is a corresponding section in the horizontal plane, Fig. 4 is an elevation of a part of the optical system of Figs. 1 to 3, Figs. 5 to 8 show in elevation modifications of the part shown in Fig. 4, Figs. 9 and 10 are perspective views of modifications of two other parts of the optical system of Figs. 1 to 3, Fig. 11 is a diagrammatic longitudinal section in the vertical plane of a modification of the optical system of Figs. 1 to 3, and Fig. 12 is a perspective view of a modification of still another part of the optical system of Figs. 1 to 3.

Referring first to Figs. 1 to 3, the novel variable density recording optical system has a light source such as the filament 10 of an incandescent lamp 11. A triangular opening 13 in a screen 14 is uniformly illuminated by light flux from lamp filament 10 so that a uniformly illuminated triangular light spot is formed at screen 14. The light beam defined by lamp filament 10 and opening 13 proceeds through the optical system and is deflected by the mirror 17 of an oscillograph galvanometer (not shown) or similar device for translating electrical impulses into mechanical vibrations. It thus has a part which is incident from opening 13 upon mirror 17, and a part which is reflected from mirror 17 towards the recording point 27. Recording point 27 is the point at which the optical axis of the system strikes the film 23, and film 23 moves past recording point 27 in a substantially vertical direction as indicated by the arrow 29.

More particularly, opening 13 is an isosceles triangle whose base extends horizontally, and mirror 17 is adapted to vibrate about an axis 18—18 which likewise extends horizontally. Furthermore, a horizontal slit 21 is formed in a screen 22 which is placed between mirror 17 and recording point 27.

A spherical condenser lens 12 is placed between lamp 11 and screen 14, and a cylindrical lens 15 which has its cylinder axis vertical, is placed between screen 14 and mirror 17. In front of mirror 17 there is placed a spherical lens 19 which acts on the reflected as well as the incident part of the light beam proceeding through the optical system. A second cylindrical lens 45 which also has its cylinder axis vertical, is placed between mirror 17 and screen 22, while a third cylindrical lens 41 has its cylinder axis horizontal and is placed between screen 22 and recording point 27.

These five imaging means have focal lengths relative to the other parts of the optical system as follows (see Figs. 2 and 3):

Spherical lens 12 has one of its conjugate foci at lamp filament 10, and the other substantially at mirror 17, that is, either on mirror 17 or at a position close thereto. Cylindrical lens 15 has one of its conjugate foci at opening 13, and the other substantially at mirror 17 so that an intermediate image of opening 13 is formed substantially on mirror 17. Spherical lens 19 has one of its conjugate foci at opening 13, and the other substantially at slit 21. Cylindrical lens 45 has one of its conjugate foci at the intermediate image of opening 13, and the other at a position B beyond recording point 27. Cylindrical lens 41, finally, has one of its conjugate foci at slit 21, and the other at recording point 27.

By virtue of the arrangement described hereinabove of its various parts, the following imagery is performed in the optical system of Figs. 1 to 3:

In the vertical plane (Fig. 2), spherical lens 19 forms an image of the uniformly illuminated opening 13 in the plane of the horizontal slit 21, or in a plane close to this plane. The image of opening 13 moves vertically across slit 21 when mirror 17 vibrates about the horizontal axis 18—18. As much of slit 21 as is illuminated by the image of opening 13, is imaged at recording point 27 by cylindrical lens 41 which is the sole means in the optical system for imaging slit 21 at recording point 27. There thus is formed at recording point 27 a horizontal line image of the illuminated portion of slit 21, and this line image has sharp and distinct horizontal boundaries. Likewise in the vertical plane, spherical lens 12 forms an image of lamp filament 10 substantially on mirror 17, thereby filling mirror 17 with light and also aiding in the uniform illumination of opening 13 by lamp filament 10.

In the horizontal plane (Fig. 3), cylindrical lens 15 forms substantially on mirror 17 the intermediate image of opening 13, and an image of the intermediate image is formed by cylindrical lens 45 at position B. Since position B is beyond recording point 27, the light flux acted upon by cylindrical lenses 15 and 45 arrives at recording point 27 in a diffused condition so that it is spread out within the horizontal boundaries of the line image formed at recording point 27 by the action of cylindrical lens 41 in the vertical plane.

Lenses 12 and 19 are spherical and hence have power in the horizontal as well as in the vertical plane. But their actions in the horizontal plane can be disregarded for the following reasons:

On account of its position and relative focal length, spherical lens 12 tends to image lamp filament 10 substantially on mirror 17 also in the horizontal plane. The action, however, of cylindrical lens 15 interferes with this imagery to such an extent that it becomes immaterial for attaining the objects of the present invention. On the other hand, the power of spherical lens 19 in the horizontal plane has no effect upon the actions of cylindrical lenses 15 and 45 on account of the proximity of spherical lens 19 to mirror 17 which is, in the horizontal plane, substantially at a common focus of cylindrical lenses 15 and 45. No actions, therefore, of spherical lenses 12 and 19 have been indicated in Fig. 3.

Cylindrical lenses 15 and 45, in their turn, do not interfere with the imagery in the vertical plane since they have their cylinder axes vertical, and hence act in only the horizontal plane. Correspondingly, cylindrical lens 41 does not interfere with the imagery in the horizontal plane since it has its cylinder axis horizontal, and hence acts in only the vertical plane.

It will thus be seen that the imagery performed in the horizontal plane of the optical system of Figs. 1 to 3 differs from the imagery performed in its vertical plane in that recording point 27 is conjugate to opening 13 in only the latter plane. The effect of this difference in imagery upon the line image formed at recording point 27 is as follows:

In the vertical plane, horizontal slit 21 is, with respect to spherical lens 19, conjugate to a horizontal line through opening 13, for example, the broken line $a$—$a$ shown in Fig. 4. Since, furthermore, recording point 27 is in the vertical plane conjugate to slit 21 with respect to cylindrical lens 41, it is also conjugate to line $a$—$a$. The line image at recording point 27 hence is an image of line $a$—$a$ as far as its vertical extension, or width, is concerned, and it is, according to a well known property of conjugates, made up of the light flux emanating from line $a$—$a$. Since, however, this light flux is, in the horizontal plane, diffused at recording point 27, the line image is not sharply defined at its ends. The light flux contained in the line image consequently decreases at its ends, but it is evenly distributed over its central portion. This central portion thus is uniformly illuminated, and its illumination is directly and linearly proportional to the horizontal extension, or length, of line $a$—$a$. When, therefore, the horizontal line through opening 13 is short—as is, for example, the broken line $b$—$b$ in Fig. 4—the central portion of the line image is dim, while it is bright when that horizontal line is long—as is, for example, the broken line $c$—$c$ in Fig. 4. [The illumination of any horizontal line through opening 13 is, of course, uniform since opening 13 is uniformly illuminated.]

The particular horizontal line through opening 13 to which recording point 27 is conjugate, is determined by the angle of inclination of mirror 17. Normally, mirror 17 is adjusted so that at its rest position, that is, when no electrical impulses are applied to the oscillograph galvanometer on which it is mounted, recording point 27 is conjugate to line $a$—$a$, which line passes through opening 13 halfway between its tip and its base. When then the electrical impulses to be recorded are applied in known manner to the oscillograph galvanometer, mirror 17 vibrates in accordance therewith about the horizontal axis 18—18 and in such a manner that, when the amplitude of its vibration is a maximum, recording point 27 is conjugate to line $b$—$b$ at the one extreme of its motion and to line $c$—$c$ at the other extreme thereof. The illumination of the central portion of the line image at recording point 27 hence varies in accordance with the vibration of mirror 17 and, therefore, the electrical impulses to be recorded. A variable density track 46 thus is produced on film 23 as it moves past recording point 27.

But the vibration of mirror 17 varies also the horizontal extension, or length, of the central portion of the line image, and when the minimum length of the central portion is less than the desired horizontal extension, or width, of the variable density track 46, distortions are introduced into track 46. In order to avoid these distortions, it is necessary to control the minimum length of the central portion by suitably choosing the focal length of cylindrical lens 45 and thereby the distance of position B from recording point 27. Track 46 is undistorted, for example, when the ratio of the distance of position B from recording point 27 to the distance of position B from cylindrical lens 45 is at least as great as the ratio of the desired width of track 46 to the aperture of cylindrical lens 45.

As has been explained hereinabove, the line image at recording point 27 is not sharply defined at its ends. The edges of the variable density track 46 hence are blurred and should be screened off when prints are made of track 46 so as to restrict the width of track 46 to its desired value. Such screening off now is commonly practiced in the printing from variable density tracks. If, however, it is desired to eliminate the blurred edges when producing track 46 on film 23, two screens 48 and 49 having vertical edges 50 and 51, respectively, or similar means, may be employed. As shown in Fig. 1, screens 48 and 49 are placed between cylindrical lens 41 and recording point 27, and are spaced apart so that edges 50 and 51 confine between themselves the desired minimum length of the central portion of the line image at recording point 27.

The illumination of the central portion of the line image at recording point 27 varies in accordance with the vibration of mirror 17 not only when cylindrical lens 45 has one of its conjugate foci at position B but, quite in general, whenever a position other than recording point 27 is, in the horizontal plane, conjugate to opening 13. Whenever this condition is fulfilled, the variable density track 46 is produced on film 23. For example, cylindrical lens 45 may have one of its conjugate foci also at some position, including slit 21, between lens 45 and recording point 27, or it may have it at infinity, in which case the light beam leaving lens 45 is parallel.

In all cases in which the position other than recording point 27, referred to in the preceding paragraph, is also a position other than slit 21— as is, for example, position B—the image of opening 13 formed substantially in the plane of slit 21 is a light spot of vertically varying illumination. When, however, slit 21 is conjugate to opening 13 with respect to cylindrical lenses 15 and 45, this image is a uniformly illuminated triangular light spot. The formation of the latter light spot in the plane of slit 21 facilitates the visual adjustment of the optical system and also the visual monitoring of the recording done with it, but is otherwise immaterial for attaining the objects of the invention.

The present invention thus provides a variable density recording optical system of the mirror oscillograph type in which the variable density effect is obtained solely by means of a novel imagery and without the use of additional parts such as graded screens, penumbra stops, or the like. At the same time, the novel imagery brings it about that the light flux from lamp filament 10 is utilized at recording point 27 in a highly efficient manner, as will be seen from the following considerations:

As has been pointed out hereinabove, the light flux from lamp filament 10 is first employed for the uniform illumination of opening 13. In the horizontal plane, which plane contains the horizontal axis 18—18 of mirror 17, an intermediate image of opening 13 then is formed by cylindrical lens 15 substantially on mirror 17, and this intermediate image is imaged by cylindrical lens 45 at a position other than recording point 27, for example, position B. Mirror 17 thus is in the horizontal plane substantially at a common focus of cylindrical lenses 15 and 45. For any given angle of inclination of mirror 17, therefore, the amount of light flux from opening 13 which arrives at recording point 27, is limited in the horizontal plane by the aperture of cylindrical lens 45 rather than the aperture of mirror 17. To cylindrical lens 45, however, there may be given an aperture which is as much as five times as great as the aperture which it is practical to give to mirror 17.

This is a marked advance over the mirror oscillograph recording optical systems of the prior art wherein the light flux from the entrance position corresponding to opening 13 is diffused at the oscillograph mirror in the two co-ordinate planes so that the mirror aperture is the limiting aperture of the optical systems also in their horizontal plane. Since the physical size of the oscillograph mirror must be comparatively small in order to avoid distortions due to its mass, the above condition has been a serious obstacle to an efficient utilization of the light flux in those optical systems. The advantage gained in this respect by the optical system of Figs. 1 to 3 is considerable because, as is well known to those skilled in the art, the efficiency with which the light flux from a given light source is utilized in an optical system, is approximately proportional to the product of the limiting apertures in its two co-ordinate planes.

Another advantage of having mirror 17 substantially at a common focus of two imaging means which act in only the horizontal plane, is that small deviations of mirror 17 about a vertical axis have a negligible effect on the imagery in the horizontal plane. Mirror 17 need therefore be accurately adjusted only about the horizontal axis 18—18. This greatly increases the ease of adjustment of the optical system, and is particularly important when it is necessary to replace the oscillograph galvanometer on which mirror 17 is mounted.

A further advantage of the novel imagery embodied, by way of example, in the optical system of Figs. 1 to 3 resides in the fact that there is formed substantially on mirror 17 an image of lamp filament 10 by the action of spherical lens 12 in the vertical plane and, simultaneously, the intermediate image of opening 13 by the action of cylindrical lens 15 in the horizontal plane. It thus is possible so to control the light flux which enters the optical system through opening 13 that it is all incident within the working aperture of mirror 17. This result is best obtained when the focal length of spherical lens 12 and the position of lamp 11 are chosen so that the image of lamp filament 10 has a vertical dimension no larger than that of mirror 17, and when the focal length of cylindrical lens 15 and the position of screen 14 are chosen so that the largest horizontal dimension of the intermediate image is no larger than the horizontal dimension of mirror 17. If these conditions are fulfilled, all the light flux passing through opening 13 is subject to control by mirror 17, whereby the formation of stray light in the optical system is reduced to a negligible amount.

The employment, finally, of cylindrical lens 41 in the portion of the optical system between screen 22 and recording point 27 has certain inherent advantages: Cylindrical lens 41 may have a short focal length so that the optical system may be built with small physical size. Moreover, a cylindrical lens of short focal length is less expensive than a spherical lens system well enough corrected to be capable of forming, over the same length, an equally sharp line image. The optical system of Figs. 1 to 3 may hence be built with greater compactness and at less cost than the mirror oscillograph recording optical systems known heretofore.

The optical system shown in Figs. 1 to 3 as an embodiment of the imagery according to the invention may be modified, without affecting the basic principles of its operation, as follows:

(1) Opening 13 in screen 14 is shown in Figs. 1 and 4, and has been described hereinabove, as being an isosceles triangle whose base extends horizontally. However, any other opening whose horizontal extension varies in a vertical direction, may be substituted for opening 13 to produce the variable density track 46 on film 23. For example, the opening in screen 14 may be a right-angled triangle with one of the sides adjacent to the right angle extending horizontally as is the opening 30 shown in Fig. 5, or there may one or more sawtooth projections extending into it as they do into the openings 31 and 32 shown in Figs. 6 and 7, respectively.

Openings 13, 30, 31, and 32, are bounded by one or more inclined edges which are straight, so that their horizontal extension varies in a linear manner. But the horizontal extension of the opening in screen 14 may also be varied in non-linear manner, for example, in order to establish a linear relation between the electrical impulses to be recorded in track 46 and the light transmission of the track used for their reproduction. This result is obtained when one or more of the inclined edges of the opening in screen 14 are curved as are the two inclined edges of the opening 47 shown in Fig. 8, a method of computing suitable curvatures being disclosed, for example, in British specification 424,042 (I. G. Farbenindustrie). Thus, distortions may be canceled which are introduced, for example, by the non-linear characteristics of the oscillograph galvanometer on which mirror 17 is mounted, or of the emulsions of the recording and printing films, or of both.

When any of the openings 13, 30, 31, 32, and 47, is in screen 14 and receives light flux from lamp filament 10 through spherical lens 12, there is formed at screen 14 a uniformly illuminated light spot whose horizontal extension varies in a vertical direction. Since, furthermore, the light flux from this light spot is, in the horizontal plane, diffused at recording point 27, a single line image is formed at this point in the case of all openings. When, therefore, mirror 17 vibrates about the horizontal axis 18—18, the illumination of the central portion of the line image varies in linear relation to the variation in horizontal extension of the light spot at screen 14. Since, finally, the latter variation is effected only by the inclined edge, or edges, of the opening in screen 14, the lower portion of screen 14 may be omitted if desired, as indicated in Fig. 5 by the broken line e—e, for example.

As in Fig. 4, the broken line a—a indicates also in Figs. 5 to 8 the horizontal line through the opening in screen 14 which is normally conjugate to recording point 27 when mirror 17 is at rest.

(2) Condenser lens 12 is shown in Figs. 1 to 3, and has been described hereinabove, as being spherical. It hence acts in both the vertical and horizontal planes. However, as has been pointed out hereinabove, its action in the horizontal plane is immaterial as far as the novel imagery disclosed in this specification is concerned. Spherical condenser lens 12 may, therefore, be replaced by a cylindrical condenser lens 65 which has its cylinder axis horizontal and hence acts in only the vertical plane. Like spherical lens 12, cylindrical lens 65 has one of its conjugate foci at lamp filament 10, and the other substantially at mirror 17. Cylindrical lens 65 may, furthermore, have the same position as spherical lens 12, in which position it is shown in Fig. 9. But since it acts in only the vertical plane, it may also have any other position between lamp 11 and mirror 17 which is consistent with its function to image lamp filament 10 substantially on mirror 17.

In designing an actual optical system with cylindrical condenser lens 65, however, the horizontal extension of lamp filament 10 should be made so great that the opening in screen 14, as seen from cylindrical lens 15, is completely filled with light.

(3) It has been explained hereinabove that, while spherical lens 19 has power in both the vertical and horizontal planes, its action in the horizontal plane can be disregarded. Spherical lens 19 may therefore be replaced by a cylindrical lens 66 which has its cylinder axis horizontal and hence acts in only the vertical plane. Like spherical lens 19, cylindrical lens 66 has one of its conjugate foci at the opening in screen 14, and the other substantially at slit 21. Cylindrical lens 66 may, furthermore, have the same position as spherical lens 19, in which position it is shown in Fig. 10. But since it acts in only the vertical plane, it may have any other position between screens 14 and 22 which is consistent with its function to image the opening in screen 14 substantially in the plane of slit 21. Spherical lens 19, on the other hand, should be placed close to mirror 17, as shown in Fig. 1, lest it interfere with the imagery in the horizontal plane.

(4) When the light beam defined by lamp filament 10 and the opening in screen 14 is incident upon mirror 17 at a sufficiently small angle, a single cylindrical lens 71 may be substituted for the two cylindrical lenses 15 and 45. Like cylindrical lenses 15 and 45, cylindrical lens 71 has its cylinder axis vertical, and it is placed so as to be transversed by the reflected as well as the incident part of the light beam proceeding through the optical system. The relative focal length of cylindrical lens 71 is so chosen that the opening in screen 14 and a position on, or close to, mirror 17 are conjugate with respect to cylindrical lens 71 on the incident part, and this position and position B, or an equivalent position, are conjugate with respect to cylindrical lens 71 on the reflected part of the light beam. In this manner, cylindrical lens 71 forms the intermediate image of the opening in screen 14 substantially on mirror 17 and, simultaneously, images the intermediate image at a position other than recording point 27.

The angle at which the light beam is incident upon mirror 17, may be made sufficiently small by considerably lengthening the optical system mechanically. However, this end may be accomplished in a more convenient way which, at the same time, provides for a very compact mechanical design of the optical system and which is shown, by way of example, in Fig. 11. It consists of placing a reflecting prism 70 between screen 14 and mirror 17 whereby the light beam is folded so that it is incident upon mirror 17 at a small angle and cylindrical lens 71 is traversed by both the incident and reflected parts of the light beam. In place of prism 70 there may be employed other suitable beam folding means such as mirrors, or the like.

(5) Whenever it is desired to employ for the imagery in the horizontal plane of the optical system two lenses instead of the single cylindrical lens 71, cylindrical lens 45 may be replaced by a spherical lens 75 which, however, must be placed adjacent to screen 22 as shown in Fig. 12. When spherical lens 75 is so placed, its action in the vertical plane is barred by screen 22 so that it acts in only the horizontal plane. Spherical lens 75 may be placed on either side of screen 22, but must be close thereto in both cases lest it interfere with the imagery in the vertical plane.

Like cylindrical lens 45, spherical lens 75 has one of its conjugate foci at the intermediate image of the opening in screen 14, and the other at a position other than recording point 27. The substitution of spherical lens 75 for cylindrical lens 45 has the advantage that a spherical lens at screen 22 is cheaper, and easier to adjust, than a cylindrical lens. The use of cylindrical lens 45, on the other hand, has the advantage that its position can be chosen independently of the position of screen 22, whereby the design of the optical system is facilitated.

(6) If it is desired to employ the optical system for recording sound in accordance with the method generally known as "noiseless recording," the well known ground noise reduction systems may be used in conjunction therewith, as will easily be understood by those skilled in the art.

Many other modifications of the invention will readily suggest themselves to those skilled in the art. The invention, therefore, is not to be limited, except in so far as is necessitated by the prior art and by the spirit of the appended claims.

What is claimed is:

1. In an optical system, the combination of means for forming a uniformly illuminated light spot whose horizontal extension varies in a vertical direction; a mirror adapted to vibrate about a horizontal axis; means forming a slit which extends horizontally; a recording point past which a film may move in a substantially vertical direction; and means for forming at said recording point a horizontal line image whose illumination varies when said mirror vibrates about said axis; said last mentioned means including first imaging means placed between said light spot and said mirror, and having first and second conjugate foci; second imaging means placed between said mirror and said slit forming means, and having third and fourth conjugate foci; third imaging means placed in front of said mirror, and having fifth and sixth conjugate foci; and fourth imaging means placed between said slit forming means and said recording point, and having seventh and eighth conjugate foci; said first imaging means acting in only the horizontal plane and having said first focus at said light spot, and said second focus substantially at said mirror so that an intermediate image of said light spot is formed substantially on said mirror; said second imaging means acting in only the horizontal plane and having said third focus at said intermediate image, and said fourth focus at a position other than said recording point; said third imaging means acting in the vertical plane and having said fifth focus at said light spot, and said sixth focus substantially at said slit; and said fourth imaging means acting in only the vertical plane and having said seventh focus at said slit, and said eighth focus at said recording point.

2. The combination defined in claim 1 wherein said first imaging means is a cylindrical lens having its cylinder axis vertical.

3. The combination defined in claim 1 wherein said first and second imaging means are each a cylindrical lens having its cylinder axis vertical.

4. The combination defined in claim 1 wherein said second imaging means is a spherical lens placed adjacent to said slit forming means.

5. The combination defined in claim 1 wherein said third imaging means is a spherical lens, and said fourth imaging means is a cylindrical lens having its cylinder axis horizontal.

6. The combination defined in claim 1 wherein said third and fourth imaging means are each a cylindrical lens having its cylinder axis horizontal.

7. The combination defined in claim 1 wherein said first and second imaging means are each a cylindrical lens having its cylinder axis vertical, said third imaging means is a spherical lens, and said fourth imaging means is a cylindrical lens having its cylinder axis horizontal.

8. A variable density recording optical system including in combination, a light source; a screen with an opening whose horizontal extension varies in a vertical direction, said opening being uniformly illuminated by said light source; a mirror adapted to vibrate about a horizontal axis; means forming a slit which extends horizontally; a recording point past which a film may move in a substantially vertical direction; a first spherical lens placed between said light source and said screen, and having first and second conjugate foci; a first cylindrical lens placed between said screen and said mirror, and having third and fourth conjugate foci; a second cylindrical lens placed between said mirror and said slit forming means, and having fifth and sixth conjugate foci; a second spherical lens placed in front of said mirror, and having seventh and eighth conjugate foci; and a third cylindrical lens placed between said slit forming means and said recording point, and having ninth and tenth conjugate foci: said first spherical lens having said first focus at said light source, and said second focus substantially at said mirror; said first cylindrical lens having its cylinder axis vertical and having said third focus at said opening, and said fourth focus substantially at said mirror so that an intermediate image of said opening is formed substantially on said mirror; said second cylindrical lens having its cylinder axis vertical and having said fifth focus at said intermediate image, and said sixth focus at a position beyond said recording point; said second spherical lens having said seventh focus at said opening, and said eighth focus substantially at said slit; and said third cylindrical lens having its cylinder axis horizontal and having said ninth focus at said slit, and said tenth focus at said recording point.

JOHN A. MAURER, Jr.

REFERENCES CITED

The following references are of record in the file of this patent:

UNITED STATES PATENTS

| Number | Name | Date |
|---|---|---|
| 2,173,681 | Dimmick | Sept. 19, 1939 |
| 2,157,166 | Dimmick | May 9, 1939 |
| 1,999,721 | Dimmick | Apr. 30, 1935 |
| 2,125,890 | Cook | Aug. 9, 1938 |
| 2,052,220 | Dimmick | Aug. 25, 1936 |
| 2,256,402 | McLeod et al. | Sept. 16, 1941 |
| 2,036,622 | Emmerich | Apr. 7, 1936 |

FOREIGN PATENTS

| Number | Country | Date |
|---|---|---|
| 424,042 | Great Britain | Feb. 5, 1935 |